(12) United States Patent
Iori et al.

(10) Patent No.: US 12,544,048 B2
(45) Date of Patent: Feb. 10, 2026

(54) SYSTEM FOR SAMPLING TISSUE FROM AN EAR OF AN ANIMAL

(71) Applicant: DATAMARS SA, Lamone (CH)

(72) Inventors: Marco Iori, Taverne (CH); Alessandro Bongiorno, Pregnana Milanese (IT); Damien Pachoud, Pregassona (CH)

(73) Assignee: DATAMARS SA, Lamone (CH)

( * ) Notice: Subject to any disclaimer, the term of this patent is extended or adjusted under 35 U.S.C. 154(b) by 869 days.

(21) Appl. No.: 17/260,887

(22) PCT Filed: Jul. 16, 2019

(86) PCT No.: PCT/EP2019/069157
§ 371 (c)(1),
(2) Date: Jan. 15, 2021

(87) PCT Pub. No.: WO2020/016248
PCT Pub. Date: Jan. 23, 2020

(65) Prior Publication Data
US 2021/0259668 A1   Aug. 26, 2021

Related U.S. Application Data

(63) Continuation-in-part of application No. PCT/EP2018/069656, filed on Jul. 19, 2018.

(51) Int. Cl.
*A61B 10/02* (2006.01)
*A01K 11/00* (2006.01)
(Continued)

(52) U.S. Cl.
CPC ........ *A61B 10/0266* (2013.01); *A01K 11/003* (2013.01); *A61B 10/0096* (2013.01); *A61D 1/00* (2013.01); *A61B 17/32053* (2013.01)

(58) Field of Classification Search
CPC ............ A61B 10/0266; A61B 10/0096; A61B 17/32053; A61D 1/00; A01K 11/003
See application file for complete search history.

(56) References Cited

U.S. PATENT DOCUMENTS 6,458,303 B1 * 10/2002 Fuehrer .................. B01D 35/26
264/DIG. 48
2001/0026851 A1  10/2001 Hilmarcher
(Continued)

FOREIGN PATENT DOCUMENTS

DE    102012023493    2/2014
EP    1219169         7/2002
(Continued)

OTHER PUBLICATIONS

English Translation of WO-02078431-A2 (Year: 2002).*

*Primary Examiner* — Alex M Valvis
*Assistant Examiner* — Anna Roberts
(74) *Attorney, Agent, or Firm* — DUANE MORRIS LLP; Gregory M. Lefkowitz; Daniel J. Tarr

(57) ABSTRACT

It is disclosed a System for sampling tissue from an ear of an animal including: —a male component (2) including a detachable sample collecting part (2b), comprising a cavity (2c) for collecting the sample and a cutting edge (2a) at an aperture of the cavity (2c) for cutting the sample from the animal ear; and —a tissue sample container (3) including a container component (30) for receiving the sample collecting part (2b) and the tissue sampled, the container component (30) having an opening (30b) closed by a sealed membrane or a cover (30d).
The tissue sample container (3) includes —a ring (31) comprising a peripheral flange (31a), a protrusion (31b) and radial portions (31c), the radial portions (31c) supporting the protrusion (31b) in the middle of the peripheral flange (31a) of the ring (31); —a moulded portion (32) around the peripheral edge (31a) of the ring (31) and the container component (30), to embed the ring (31) and the container
(Continued)

component (30) above the sealed membrane or cover (30*d*), preventing detachment thereof, wherein the protrusion (31*b*) projects from the middle of the ring (31) in a direction opposite with respect to the container component (30) and wherein a length of the protrusion (31*b*) is equal to or minor than a depth of the cavity (2*c*) of the sample collecting part (2*b*) to enter entirely the cavity (2*c*) through the aperture thereof so as the cutting edge (2*a*) contacts the radial portions (31*c*) for cutting them at a predetermined portion (31*cc*) during use, when the sample collecting part (2*b*) is moved in a same axis along which the protrusion (31*b*) is arranged.

16 Claims, 6 Drawing Sheets

(51) Int. Cl.
*A61B 10/00* (2006.01)
*A61B 17/3205* (2006.01)
*A61D 1/00* (2006.01)

(56) References Cited

U.S. PATENT DOCUMENTS

| | | |
|---|---|---|
| 2002/0137033 A1 | 9/2002 | Brem |
| 2004/0093775 A1 | 5/2004 | Brem |
| 2008/0044313 A1 | 2/2008 | Caisley |
| 2008/0156817 A1 | 7/2008 | Roseblade |
| 2008/0228105 A1 | 9/2008 | Howell |
| 2014/0249449 A1 | 9/2014 | Hilpert |
| 2015/0289477 A1* | 10/2015 | Nehls ............ A61B 10/0096 600/567 |

FOREIGN PATENT DOCUMENTS

| | | | |
|---|---|---|---|
| EP | 2384618 | 11/2011 | |
| WO | 02078431 | 10/2002 | |
| WO | 2014199312 | 12/2014 | |
| WO | 2017/153866 | 9/2017 | |
| WO | WO-02078431 A2 * | 10/2022 | ......... A01K 11/002 |

* cited by examiner

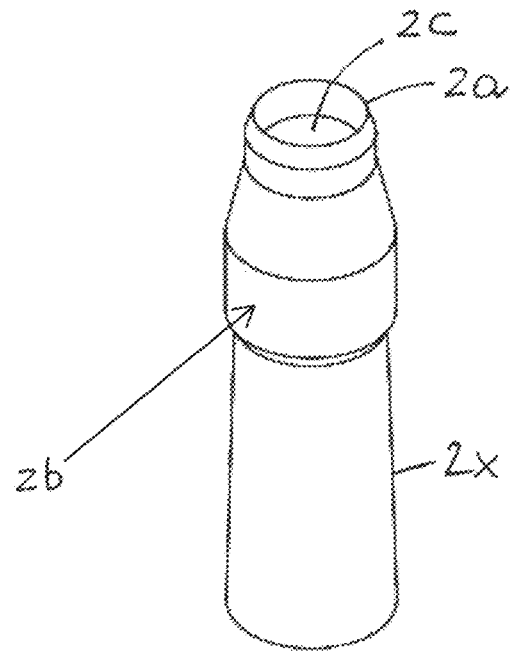
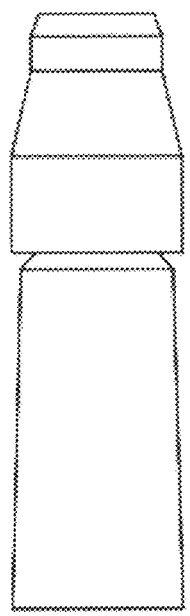
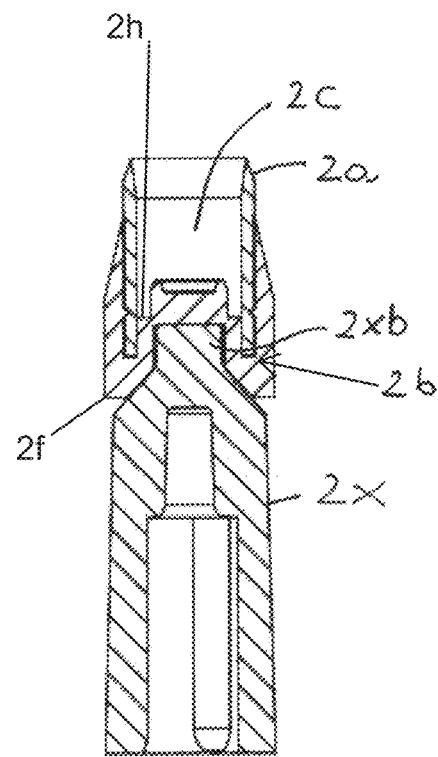
Fig. 1a    Fig. 1b    Fig. 1c
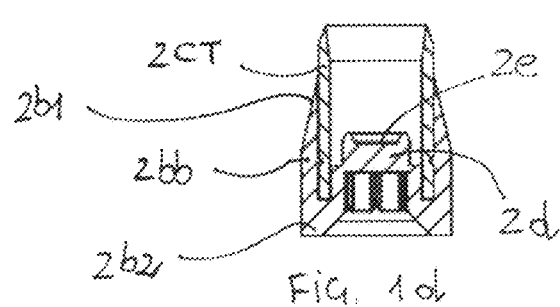
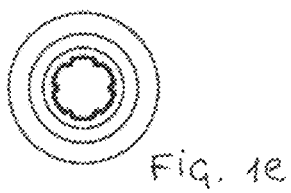
Fig. 1d    Fig. 1e
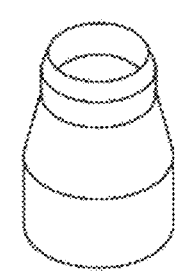
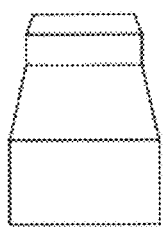
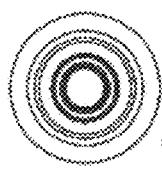
Fig. 1f    Fig. 1g    Fig. 1h

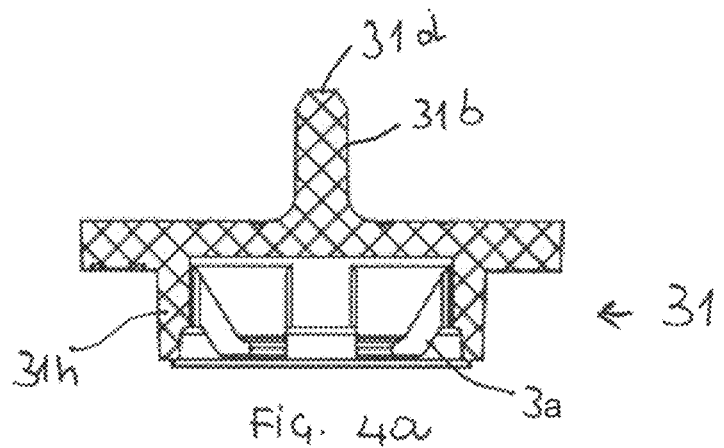
FIG. 4a
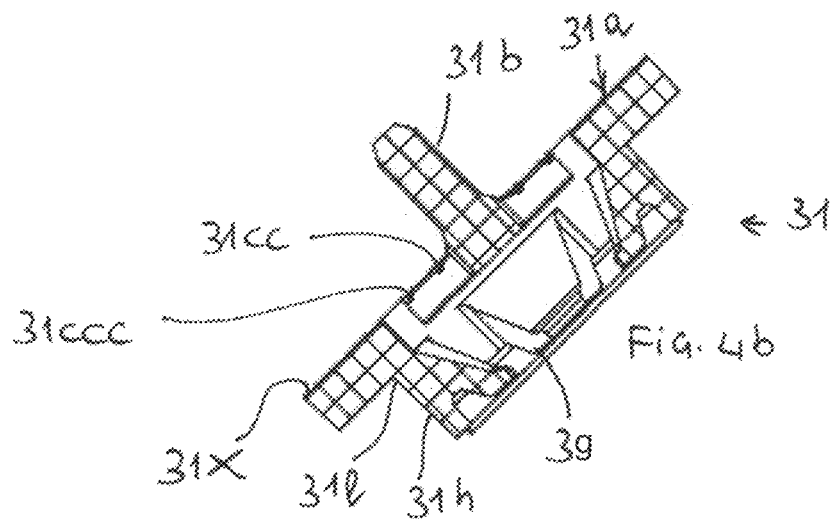
FIG. 4b
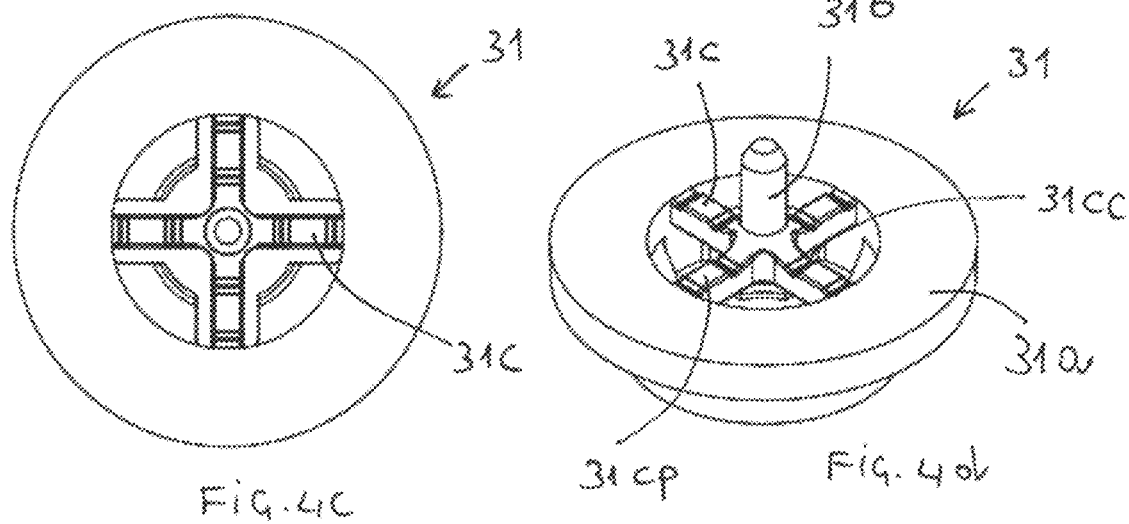
FIG. 4c
FIG. 4d

SYSTEM FOR SAMPLING TISSUE FROM AN EAR OF AN ANIMAL

CROSS-REFERENCE TO RELATED APPLICATIONS

This application is a § 371 national stage entry of International Application No. PCT/EP2019/069157, filed on Jul. 16, 2019, which is a continuation-in-part of PCT/EP2018/069656, filed on Jul. 19, 2018, the entire contents of which are incorporated herein by reference.

FIELD OF APPLICATION

The present application relates to a system for sampling tissue from an ear of an animal.

In particular, the present invention relates to a system of the type mentioned above including a male component comprising a detachable sample collecting part having a cavity, for collecting the sample, and a cutting edge at an aperture of the cavity, for cutting the sample from the animal ear.

More particularly, the system for sampling the tissue of the present invention further includes a tissue sample container comprising a container component for receiving the detachable sample collecting part and the tissue sampled, wherein the container component has an opening closed by a sealed membrane or a cover.

The sealed membrane or a cover is broken by the cutting edge during sampling to allow the tissue sampled entering the tissue sample container, and the detachable sample collecting part closes again the tissue sample container with the tissue sampled in it.

PRIOR ART

Systems for sampling tissue from an ear of an animal are known.

For instance, EP1219169 discloses a system including
a pin with a pin-plate,
a counter-plate and
a tissue sample container.

In use, the pin collects a sample from an ear of an animal, punching the ear between a detachable cutting tip of the pin and the counter-plate. The cutting tip cuts also the counter-plate and enters the tissue sample container, sealing it.

Although appreciated, this system is limited by several drawbacks.

First of all, the tip of the pin has to cut also the counter-plate. So higher forces are involved in the sampling than the ones required for simply cutting the tissue, therefore causing possible stress to the animal' ear or possible damages to the tissue.

Moreover, the system can be used only when sampling has to be executed together with tagging. Indeed, the sample container and the detachable cutting tip with the sampled tissue can be taken away (to the laboratory) but the counter-plate (perforated) and the pin plate remains attached to the ear of the animal for tagging as, respectively, female and male plated components. These components are not removable from the animal's ear. Furthermore, during sampling, the cutting tip may be not correctly centred with respect to the aperture of the tissue sample container, since arranged on a counter posed part of the counter plate with respect to the aperture.

Furthermore, the tissue sample may be damaged or lost during the sampling operation, for instance when calves or other animals having thin ear's skins are sampled. Loss of the sample or insufficient quantity of tissue sample may however occur with any kind of animal, with the known system. Indeed, the sample may fall outside the cutting tip after cut. This may occur immediately after the cut, since the sample moves outside a peripheral edge of the cutting edge, therefore never entering the tip. In other cases, the sample actually enters the tip after the cut but subsequently exits therefrom, due to inappropriate movements of the tip along the path towards the tissue sample container.

Often, the operator is not aware of a failure in collecting the tissue sample. Indeed, also when the tissue is lost during sampling, the tissue sample container is sealed by the tip of the male component which, at least in part, hides the interior of the container. Therefore, the operator may believe that sampling have occurred properly although, actually, no tissue sample is stored inside the container.

All these problems affect the daily practise of operators responsible for sampling, to the extent that they must pay particular care and attention to avoid losing or damaging the sample. Also with all due care, it is however not easy (if not impossible) to visually follows the sample along the path from where it is initially cut from the animal's ear to the tissue sample container, especially at the interface between the counter-plate and the tissue sample container.

A system where no counter-plate is provided in the region of cut is known from WO 2013/060690. In this system, there is still
a pin with a plate and with a cutting tip for collecting the tissue sample from the animal's ear;
a female component and
a tissue sample container.

However, the female component, instead of forming a counter-plate in the region of cut, is provided with a hole. In this hole, a sample fixating spike member is provided to improve collection of the sample.

However, this system is still affected by problems.

First of all, tagging has still to be executed together with sampling. Indeed, the female component remains attached to the animal's ear with the pin plate in a non-removable way. In this respect, the system cannot work without a female component, since it is also used to keep in place the tissue sample container in the passage, before sampling. The same spike member is arranged between the female component and the tissue sample container or directly attached to the female component.

Further limitations of this system are complexity of the structure and operating efficiency of the spike member.

As to the structure, the spike member has to be retained in the female component or clamped between female component and tissue sample container (before sampling). Therefore, at least three separate components (pin, female component, tissue sample container) are required and have always to be assembled before sampling and tagging.

As to the operating efficiency, the spike member has to slide into the sample container, and the load applied by the tip of the pin onto the spike member has to cause the spike member to move away from an initial position in the female toward the bottom of the tissue sample container. However, it is not easy to balance the load applied to the tip, on the field; therefore, it often happens that the spike member does not move as expected in the tissue sample container and, as a consequence, no improvement in the collection of the sample is reached.

Also in case the spike member breaks, instead of moving away from the initial position, collection improvement is not guaranteed because, for instance, part of the broken spike member may enter the female component (passage), to which the spike member is indeed attached, and therefore damage the tissue sampled.

The problem at the base of the present invention is that of providing a system for sampling tissue of an animal which is more reliable, easy to use, indicating the presence of the tissue inside the container, but also adapted for tissue sampling only, i.e. without necessarily requiring tagging, therefore overcoming all the problems that presently affect the prior art system.

SUMMARY OF THE INVENTION

According to the idea of solution mentioned above, the technical problem is solved by a system for sampling a tissue sample according to one of the claims from 1 to 16.

The technical problem is also solved by a sampling tool as follows:

The sampling tool for the system of claim 1 including a first jaw and a second jaw, wherein the first jaw is adapted to support the male component (2) and the second jaw is adapted to support the tissue sample container (3) with the female component (4) thereto coupled, before sampling, and wherein, after sampling, the second jaw is provided with means to support the tissue sample container (3), the male component (2) and the female component (4), and wherein said means of the second jaw support the tissue sample container (3) with the detachable sample collecting part (2*b*) inserted in it after sampling leaving the female part (4) and a portion (2*x*) of the male component (2) which is detached from the detachable sample collecting part (2*b*) free to be detached from the tissue sample container (3).

Further advantages and features of the system and the sampling tool according to the present invention are apparent from a description of an embodiment thereof, given here below with reference to the drawings only for exemplificative and not limiting purpose.

BRIEF DESCRIPTION OF THE DRAWINGS

FIG. 1*a* is a perspective view of a male component of the system for sampling tissue according to the present invention.

FIG. 1*b* is a front view of the male component 2 of the system of FIG. 1*a*.

FIG. 1*c* is a sectional view of the male component 2 of the system of FIG. 1*a*.

FIG. 1*d* is a sectional view of a detachable sample collecting part 2*b* of the male component 2 of FIG. 1*a*.

FIG. 1*e*-1*h* are, respectively, a top view, a perspective view, a front view and a bottom view of the detachable sample collecting part 2*b* of the male component 2 of FIG. 1*d*.

FIG. 4*a* is a sectional view of a ring of the sample container of FIG. 3.

FIG. 4*b*-4*d* are, respectively, a different sectional view, a top and a perspective view of the ring of the sample container of FIG. 3.

DETAILED DESCRIPTION

Figure 2A:
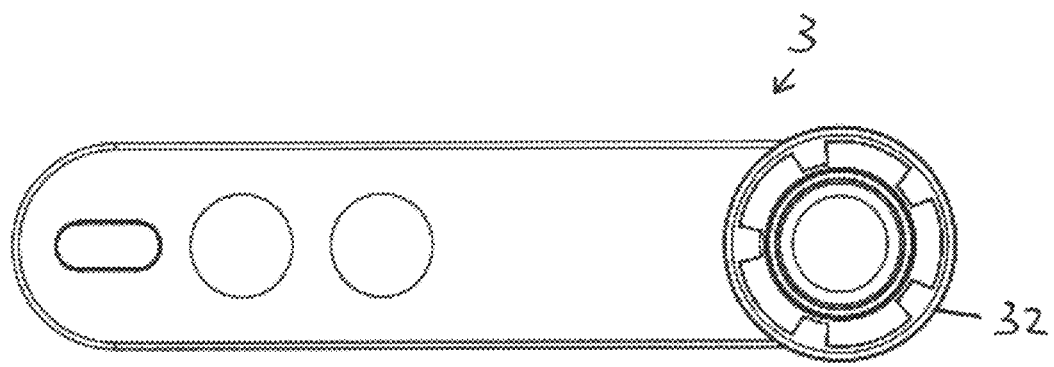
FIG. 2*a* is a bottom view of a sample container of the system for sampling tissue according to the present invention.
Figure 2B:
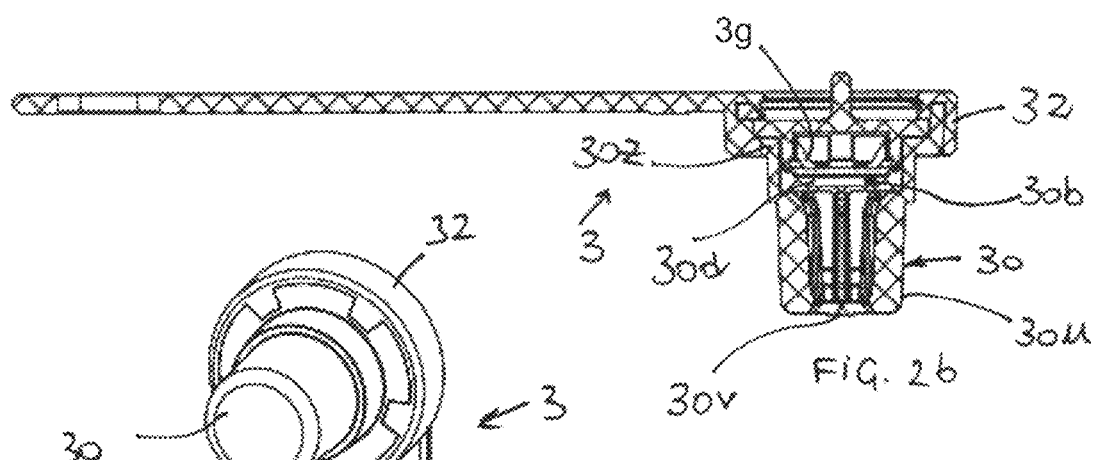
FIG. 2*b*-2*c* are, respectively, a sectional view and perspective view of the sample container of FIG. 2*a*.
Figure 2C:
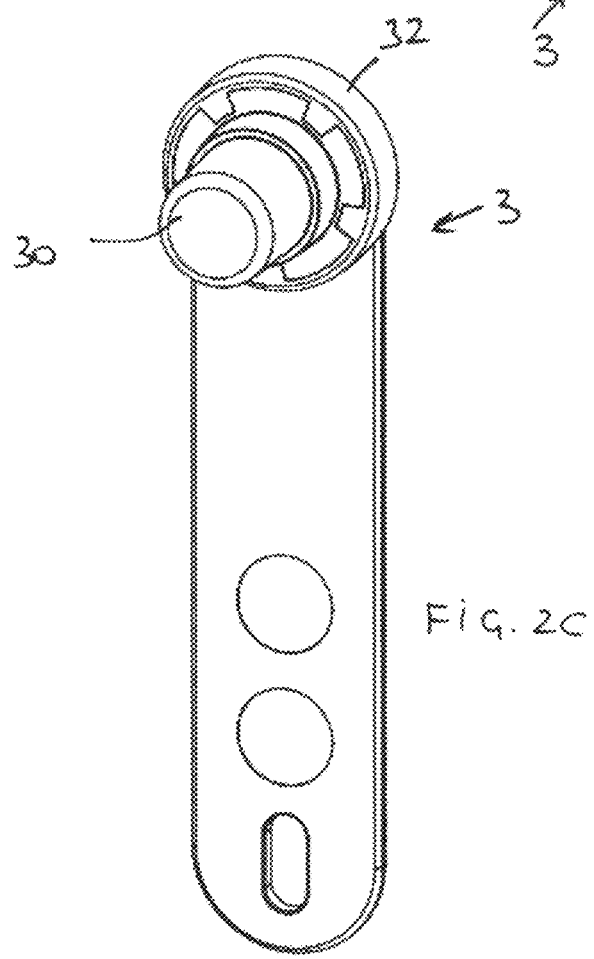
Figure 3:
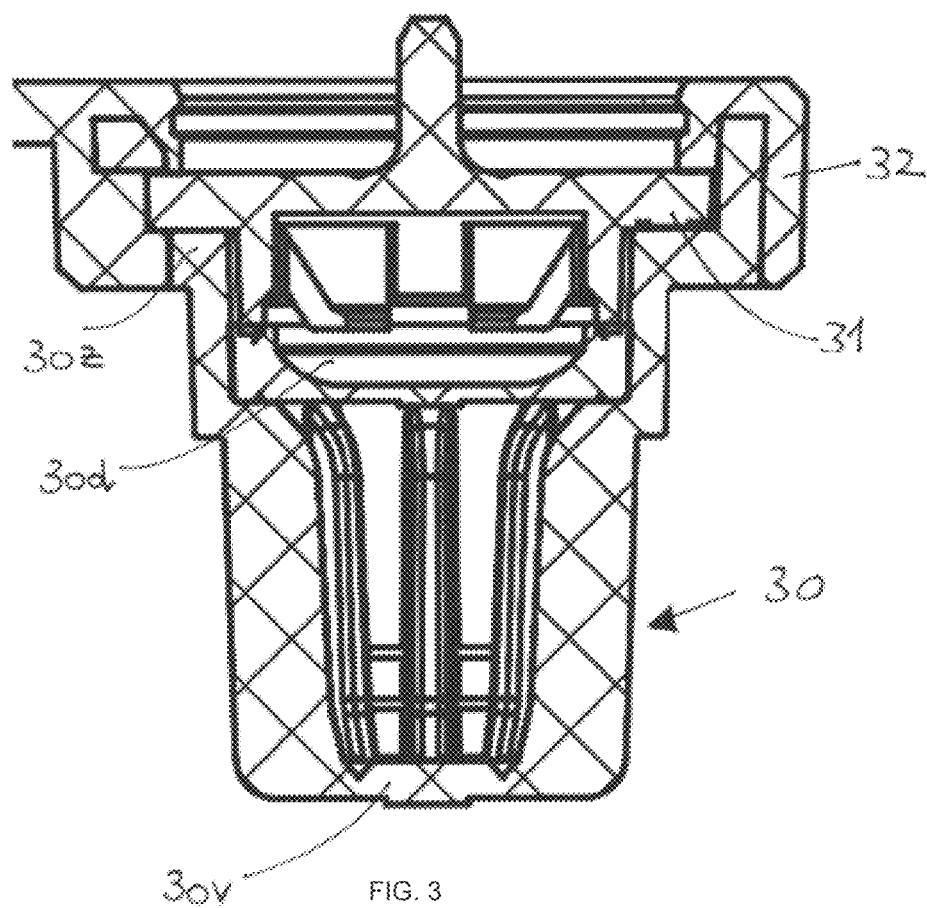
FIG. 3 is a magnified view of a particular of the sample container of FIG. 2*b*.
Figure 5A:
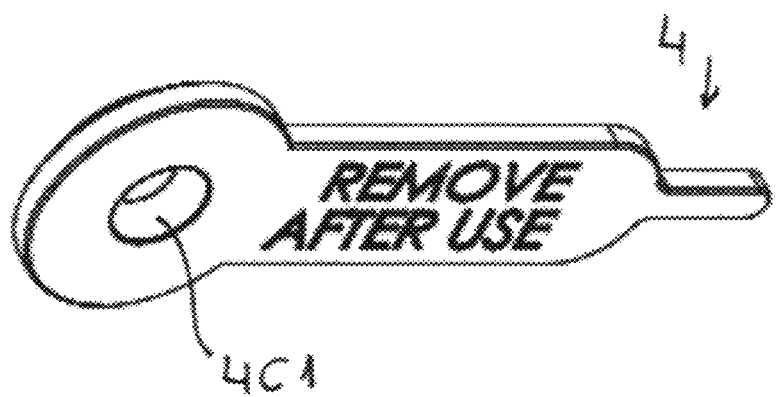
FIG. 5*a*-5*c* are, respectively, a perspective, a top and a sectional view of a female component of the system for tissue sampling according to an embodiment of the present invention.
Figure 5B:
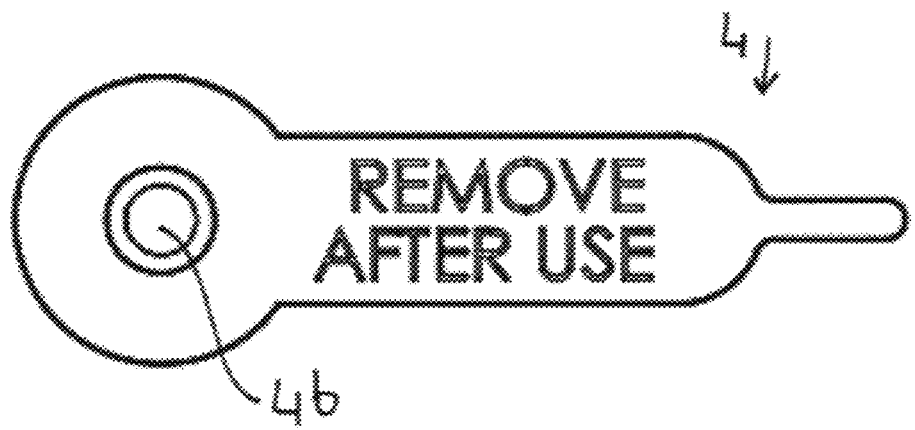
Figure 5C:
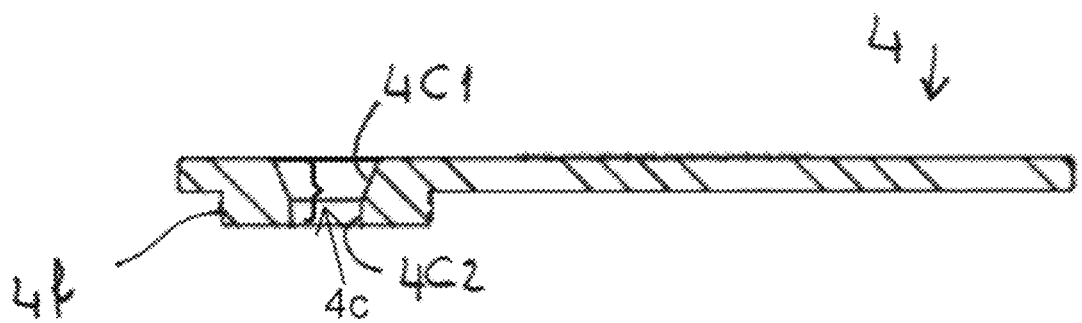
Figure 6A:
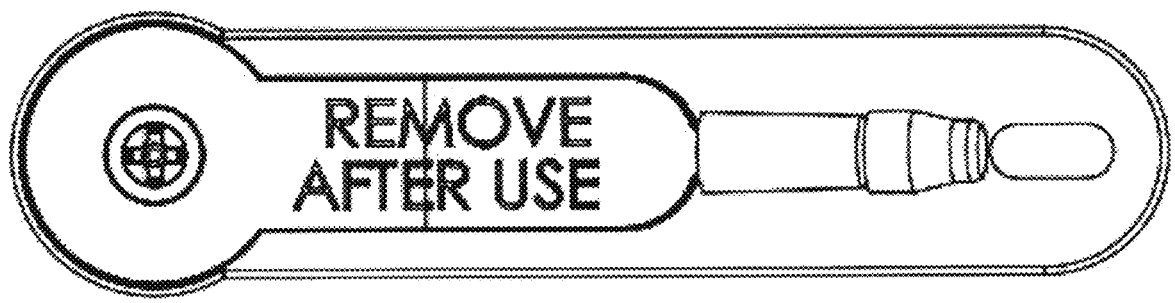
FIG. 6*a*-6*b* are, respectively, a top view and a perspective view of the system for tissue sampling according to an embodiment of the present invention.
Figure 6B:
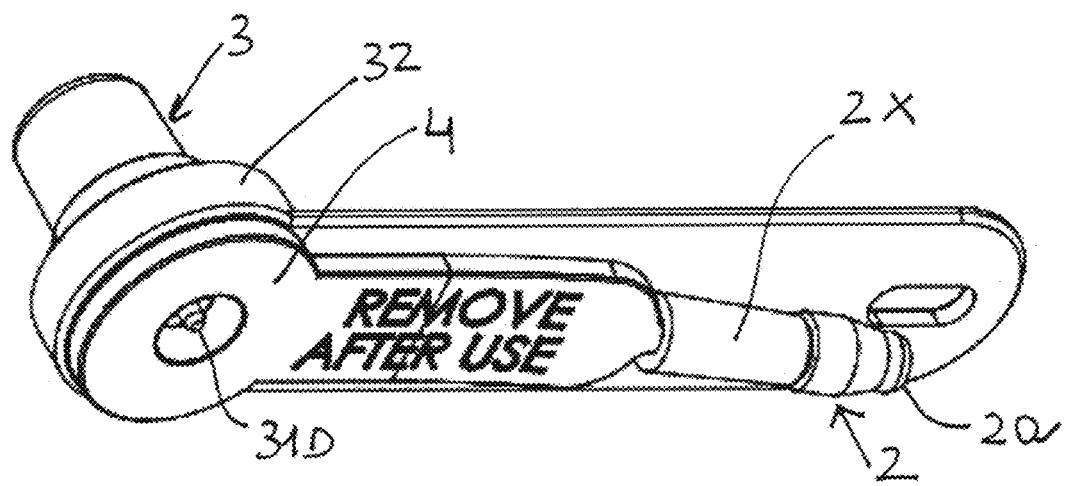

With reference to the drawings, it is here below described a system for sampling tissue from an ear of an animal according to the present invention.

The system includes a male component 2 to collect the sample by removing it from the ear of the animal. More particularly, the male component includes a support 2*x* and a sample collecting part 2*b* which is detachable from the support 2*x*.

For instance, the support 2*x* is a hollow cylindrical plastic member and supports the detachable sample collecting part 2*b* at a base portion 2*xb* of the hollow cylindrical member; according to one of the possible embodiments, also the detachable sample collecting part 2*b* includes a hollow cylindrical plastic portion 2*bb*, which is inserted on the base portion 2*xb* of the hollow cylindrical plastic member 2*x*. Accordingly, the detachable sample collecting part 2*b* is supported by said base portion 2*xb* and is detached therefrom by applying a force in an axial direction of the hollow cylindrical plastic member 2*x*.

The detachable sample collecting part 2*b* further includes a cavity 2*c* for collecting the sample and a cutting edge 2*a* at an aperture of the cavity 2*c* for cutting the sample from the animal ear. More particularly, in a preferred embodiment, the cavity 2*c* and the cutting edge 2*a* are formed, respectively, by an inner surface and an edge of a hollow cylindrical cutter 2*ct* supported at an end 2*b*1 of the hollow cylindrical plastic portion 2*bb*, the end 2*b*1 being opposed to another end 2*b*2 where the hollow cylindrical plastic portion 2*bb* is supported by the support 2*x*. Preferably, the cutter 2*ct* is cylindrical, the end 2*b*1 of the hollow cylindrical plastic portion 2*bb* is cylindrical and the cutter 2*ct* is inserted at the end 2*b*1.

During use, the male component is mounted on a stem of a first jaw of a sampling tool and, through this first jaw, is put in contact with a side of the ear having the other side engaged by a tissue sample supported by a second jaw of the sampling tool, as explained below. On the first jaw, only the male component 2 is supported. The male component has no flag, i.e. around the stem of the first jaw only the hollow cylindrical member 2*x* is arranged.

The tissue sample container 3 is adapted to be mounted on the second jaw and to receive the tissue sampled, when the detachable sample collecting part 2*b* of the male component 2 pass from one side to the other side of the ear due to the closure of the first and second jaws of the sampling tool.

The tissue sample container 3 includes a container component 30 for receiving the detachable sample collecting part 2*b* and the tissue sampled.

Specifically, the container component 30 has an opening 30*b* closed by a sealed membrane or a cover 30*d*, preferably container component 30 containing a conserving agent, in liquid or solid form, to preserve the tissue sampled. In use, i.e. during sampling, the sealed membrane or cover 30*d* is broken by the cutting edge 2*a* of the detachable sample collecting part 2*b*, leaving the tissue sample entering the container component 30.

According to the present invention, the tissue sample container 3 includes a ring 31 comprising a peripheral flange 31a, a protrusion 31b and radial portions 31c. The radial portions 31c supports the protrusion 31b in the middle of the ring 31, connecting the protrusion 31b with the peripheral flange 31a. The protrusion 31b is used to improve reliability of the sample as apparent from the description further below.

The tissue sample container 3 includes a moulded portion 32 around the peripheral edge 31a of the ring 31 and the container component 30, embedding the ring 31 and the container component 30 above the sealed membrane or cover 30d and preventing detachment of the container component 30 from the ring 31. More particularly, detachment is prevented both before and after sampling the tissue, so as the ring 31 and the container component 30 may be considered integral parts of the tissue sample container 3.

Preferably, the moulded portion 32 is only around an upper portion 30z of the container component 30 where the ring 31 is located. In this respect, the opening 30b and the sealed membrane or cover 30d are preferably arranged below the upper portion 30z, where no moulded portion is provided.

In one specific and not limiting embodiment, the ring 31 may include a wall 31h extending from a middle portion 31L of the peripheral flange 31a in a direction opposite to the direction along which the protrusion 31b extends. More particularly, the extension direction of the protrusion is parallel with respect to the extension direction of the wall 31h, which in turn is perpendicular to a surface of the peripheral flange. The wall 31h is inserted in the upper portion 30z of the container component 30 and is in contact with an inner surface of the upper portion 30z. Part 31x of the peripheral flange 31a extending outside the middle portion 31L is outside the upper portion 30z of the container component 30 and the moulded part 32 is around the upper portion 30z of the container component 30 and around the extended portion 31x of the peripheral flange 31a. Although this arrangement improves connection of the ring 31 and the container component 30, different embodiments are however within the scope of protection of the present invention.

Still according to the present invention, the protrusion 31b projects from the middle of the ring 31 in a direction opposite with respect to the container component 30 and a length of the protrusion 31b is equal to or minor than a depth of the cavity 2c so as the cutting edge 2a, during use, i.e. when the detachable sample collecting part 2b is moved along an axis where the protrusion 31b is extended, contacts the radial portions 31c, cutting them at a predetermined distance from the protrusion 31b.

Accordingly, the bottom of the cavity is not contacted by the protrusion 31b, at least not before the cutting edge 2a contacts the radial portions 31c. This arrangement improves the precision of removal of the protrusion 31b from the ring 31 and therefore simplify sampling, also avoiding to apply undue force on the jaws of the sampling tool and the risk of damaging the sample.

Preferably, each one of the radial portions 31c includes a weakening line 31cc arranged at the predetermined distance where the cutting edge 2a cuts. At least part 31cp of the radial portions 31c is more distant from the projection with respect to the weakening line 31cc.

A cross section of the cavity 2c is grater that a cross section of the protrusion 31b and a guiding portion (explained below in one preferred embodiment) prevents an inner lateral surface of the cavity 2c from entering in contact with the protrusion 31b, during use. The guiding portion advantageously provide a same space between the protrusion 31b and the cavity 2a all around the protrusion 31b, avoiding that the tissue is pinched or ripped, in other word providing precise centring of the protrusion in the cavity.

Preferably, the cavity 2c is cylindrical and the protrusion 31b is cylindrical as well.

The peripheral flange 31a of the ring 31 is coplanar with the radial portions 31c. Between adjacent radial portions 31c and the peripheral edge 31a arranged between such adjacent radial portions 31c, the hole of the ring 31 is provided.

For instance, in the drawings, four radial portions 31c are provided. Therefore, four corresponding holes are provided.

Each one of the four radial portions 31c may include an additional weakening line 31ccc arranged between the weakening line 31cc and the peripheral flange 31a.

According to one aspect of the present invention, a bottom 2d of the cavity 2c includes a seat 2e for a tip 31d of the protrusion 31b, the seat 2e being preferably provided with locking means to keep the tip 31d attached to the detachable sample collecting part 2b in the cavity 2c, after sampling. The bottom of the cavity and the seat may be formed in the detachable connecting portion 2b, i.e. at the base portion 2b1 thereof. According to this aspect, the protrusion 31b is not free to move in the container component 30 after sampling but it is kept in a predetermined position by the seat 2e, improving control of the correct sampling. Further or alternative means may be provided to this aim (improving control), as explained here below.

For instance, the protrusion 31b and part of the radial portions 31c remaining attached to the protrusion 31b after cut (the parts between the protrusion and the weakening lines 31c) are visible in the container component 30, due to a material and colour used for the container component 30.

Preferably, the ring 31 has a colour different from a colour of the container component 30 and at least one of a peripheral edge 30u or a bottom 30v of the container component 30, or the sealed membrane or the cover 3d is transparent, to allow a user looking through the container for controlling correct sampling.

The ring 31 further includes fastening means 3g projecting towards the opening 30b of the container component 30. Preferably, the fastening means 3g are formed are an inclined surface included between the peripheral edge 31a and the membrane 30d in an axial direction of the tissue sample container 3 and included between the wall 31h and the axis of the tissue sample container 3.

The detachable sample collecting part 2b comprises an engagement profile 2f and a closure surface 2h.

The fastening means 3g lock the engagement profile 2f of the detachable sample collecting part 2b after sampling.

The closure surface 2h is adapted to contact an inner surface of the container component 30, to close the opening 30d thereof after sampling. Accordingly, the sampled tissue is preserved inside the container component 30 by the sample-conserving agent, in liquid or solid form, which is enclosed with the samples tissue by the detachable sample collecting part 2b.

In one aspect of the present invention, the system also includes a female component 4. Differently from the prior art system, however, the female component is not provided for tagging purpose and it is removable from the sampling tool after sampling, i.e. it does not remain attached to the animal's ear. In used, the female is mounted on the second jaw together with the tissue sample contained, closer to the ear with respect to the tissue sample contained, i.e. at a top portion of the to the tissue sample contained.

For instance, the female component 4 is attached, in a removable way, to the moulded portion 32 of the tissue sample container 3 above the ring 31.

The female component 4 comprises a hole 4b arranged on the axis of the protrusion 31b. The protrusion 31b is at least in part arranged in the hole 4b of the female component 4.

The female component 4 further includes means 4a for retaining a portion 2x (the hollow cylindrical member) of the male component 2 after sampling, when the detachable sample collecting portion 2b is detached from the portion 2x of the male component 2, since blocked in the tissue sample container 3.

More particularly, in use, the first jaw is closed on the second jaw so as the cutting edge 2a cuts the animal's ear, the detachable sample collecting portion 2b pass on the other side of the animal's ear, entering the tissues sample container 3 and remained engaged in it. When the sampling tool is opened, the hollow cylindrical member 2x remains in the female component, engaged by the retaining means 4a, on the second jaw, while the stem of the first jaw exit from the hollow cylindrical member 2x, free from any component. Also the animal's ear remains free since it can escape from the hollow cylindrical member 2x through the hole formed in the hole by the cutting edge 2a. At this point, the hollow cylindrical member 2x may be removed from the second jaw together with the female component; the tissues sample container 3 is removed as well, with the detachable sample collecting portion 2b attached to it.

Use of such a female also when tagging is not required is advantageous for several reasons.

First of all, the female component 4 forms a flat surface against which the animal's ear can be pressed when the tissue is punched. Although in absence of the female component, the system of the present invention is perfectly working, a gap may be formed at the region of the second jaw, between a surface of the second jaw where the animal's ear is arranged and an upper surface of the tissue sample container 3, especially if a sampling tool of the type already available on the marked for tagging and sampling is used (which indeed is design to support also the female component for tagging, in such a space). In such a particular circumstance, the female component 4 of the present invention may compensate the gap and improve sampling, at the same not requiring tagging.

Furthermore, the female component 4 has the effect of reducing the overall pressure on the ring 31, during the cutting phase. Potentially, in absence of a female component 4, the ring could break before the cutting edge 2a cuts the radial portions 31c, eventually resulting in a faulty application.

At last, the female component 4 simplifies removal of the hollow cylindrical member 2x at the end of sampling; in absence of the female component 1, the hollow cylindrical member 2x may still be removed but with more efforts due to its small size. In this respect, the female component 4 may comprise a flag, which is easy to handle. In a preferred embodiment, the flag of the female component 4 comprises a carrier for the male component 2, the carrier being for instance a tip on which the hollow cylindrical member of the male component 2 is inserted. Of course, the male component is carried in this way not during sampling but at an earlier or later stage.

Preferably, also the tissue sample container (3) may comprise a flag including identification information. The male component 2 has no flag, as already specified.

The guiding portion mentioned above, in one preferred embodiment of the present invention, is formed by the female component 4. For instance, the guiding portion is a surface 4c of the hole 4b of the female component 4. The surface includes a first inclined surface 4c1 with a cross section decreasing from a top of the hole 4b towards a bottom of the hole 4b, and a second cylindrical surface 4c2 connected to the first inclined surface 4c1 at a lower cross section of the first inclined surface 4c1. The surface 4c guides the detachable sample collecting portion 2b due to shape coupling, i.e. providing centring of the detachable sample collecting portion 2b on the axis of the protrusion.

Means are provided in the system to couple the female component 4 with the tissue sample container 3 in a removable way. For instance, tissue sample container 3 includes locking means 3i engaging the female component 4, preferably the locking means 3i being an annular groove 3i having shape coupling with an annular projection 4f around the second cylindrical surface 4c2 of the female hole 4b, wherein the locking means 3i are releasable for detaching the female component 4 from the tissue sample container 3.

Preferred ratio between the size of the hole 4b of the female and the size of the protrusion is the following. The protrusion 31b has a cylindrical shape and a diameter of the protrusion 31b is between 1:6 and 1:2 of a diameter of the hole 4b.

It is in the scope of protection of the present invention a sampling tool for sampling an animal's ear with the system of the present invention.

The sampling tool includes a first jaw and a second jaw, wherein the first jaw is adapted to support the male component 2 and the second jaw is adapted to support the tissue sample container 3, before the sampling tool is closed for sampling.

In a first embodiment, the second jaw is sized to support only the tissue sample container 3 and therefore to avoid gaps between the surface of the second jaw where the animal's ear has to be arranged and the tissue sample container 6.

In a second embodiment, the second jaw is sized to support the tissue sample container 3 and also the female component 4.

After sampling, the second jaw supports the tissue sample container 3, the male component 2 and the female component 4 (where provided).

The second jaw supports the tissue sample container 3 with the detachable sample collecting part 2b inserted in it after sampling leaving the female part 4 and a portion 2x (hollow cylindrical member 2x) of the male component 2 which is detached from the detachable sample collecting part 2b free to be detached from the tissue sample container 3.

The invention claimed is:

1. A system for sampling tissue from an ear of an animal including:
a male component including a detachable sample collecting part, comprising a cavity for collecting a sample and a cutting edge at an aperture of the cavity for cutting the sample from the animal ear; and
a tissue sample container including a container component for receiving the sample collecting part and the tissue sampled, the container component having an opening closed by a sealed membrane or a cover,
wherein:
the tissue sample container includes a ring comprising a peripheral flange, a protrusion and radial portions, the radial portions supporting the protrusion in a middle of the ring, connecting the protrusion with the peripheral flange; and the tissue sample container further includes a moulded portion around the peripheral flange of the ring and the container component, embedding the ring and the container component above the sealed membrane or cover and preventing detachment of the container component from the ring, wherein the protrusion projects from the middle of the ring in a direction opposite with respect to the container component and wherein a length of the protrusion is equal to or less than a depth of the cavity so the cutting edge during use, when the sample collecting part is moved along an axis where the protrusion is extended, contacts the radial portions for cutting the radial portions at a predetermined distance from the protrusion, wherein the moulded portion remains un-removably attached to the peripheral flange of the ring and to the container component.

2. The system according to claim 1, wherein each one of the radial portions includes a weakening line arranged at said predetermined distance.

3. The system according to claim 1, wherein a cross section of the cavity is greater than a cross section of the protrusion and wherein a guiding portion of the system prevents an inner lateral surface of the cavity from entering in contact with the protrusion.

4. The system according to claim 1, wherein the peripheral edge of the ring is coplanar with the radial portions.

5. The system according to claim 1, wherein a bottom of the cavity includes a seat for a tip of the protrusion, the seat being provided with a locking profile to keep the tip attached to the detachable sample collecting part in the cavity, after sampling.

6. The system according to claim 1, wherein said protrusion and part of the radial portions remaining attached to the protrusion after the cutting at said predetermined distance are visible in the container component.

7. The system according to claim 1, wherein the ring has a colour different from a colour of the container component and wherein at least one of a peripheral edge or a bottom of the container component, or the sealed membrane or the cover is transparent.

8. The system according to claim 1, wherein there are four radial portions, each one of the four radial portions including an additional weakening line arranged between said weakening line and the peripheral flange.

9. The system according to claim 1, wherein the ring includes a fastening profile projecting towards the opening of the container component, and the detachable sample collecting part comprises an engagement profile and a closure surface, the fastening profile being arranged to lock the engagement profile of the detachable sample collecting part after sampling and the closure surface being adapted to contact an inner surface of the container component, to close the opening thereof after sampling.

10. The system according to claim 1, wherein the container component includes a sample-conserving agent, in liquid or solid form.

11. The system according to claim 1, wherein the ring remains un-removably attached to the container component due to the moulded portion.

12. The system according to claim 1, wherein the tissue sample container includes a locking profile engaging a female component, the locking profile being in the form of an annular groove having shape coupling with an annular projection around the second cylindrical surface of a hole of the female component, wherein the locking profile is releasable for detaching the female component from the tissue sample container.

13. The system according to claim 12, wherein the protrusion has a cylindrical shape and a diameter of the protrusion is between 1:6 and 1:2 of a diameter of the hole of the female component.

14. The system according to claim 12, wherein the tissue sample container comprises a respective flag, including identification information, wherein the male component has no flag.

15. The system according to claim 14, wherein the flag of the female component comprises a carrier for the male component, the carrier being a tip on which a hollow cylindrical portion of the male component is inserted.

16. A sampling tool for the system of claim 1, including a first jaw and a second jaw, wherein the first jaw is adapted to support the male component and the second jaw is adapted to support the tissue sample container with a female component thereto coupled, before sampling, and wherein, after sampling, the second jaw supports the tissue sample container, the male component and the female component, with the detachable sample collecting part inserted in the tissue sample container, leaving the female component and a portion of the male component which is detached from the detachable sample collecting part free to be detached from the tissue sample container.

* * * * *